Aug. 12, 1924.
T. J. MADIGAN
LOCKED COUPLING
Filed Jan. 20. 1921
1,504,363
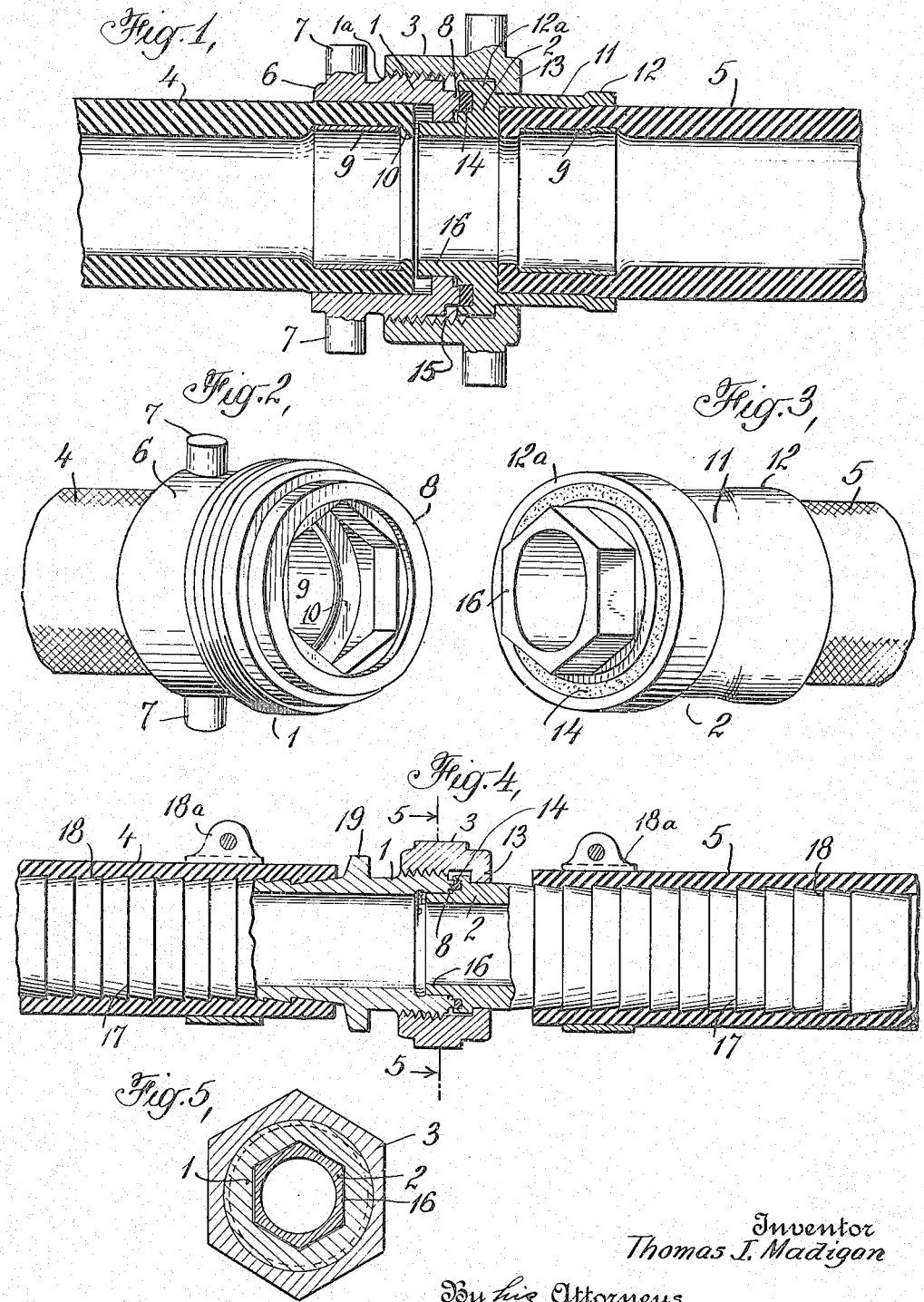
Inventor
Thomas J. Madigan
By his Attorneys
Pennie Davis Marvin & Edmonds Patented Aug. 12, 1924.

1,504,363

UNITED STATES PATENT OFFICE.

THOMAS J. MADIGAN, OF NEW YORK, N. Y., ASSIGNOR TO MADIGAN UNION CORPORATION, A CORPORATION OF DELAWARE.

LOCKED COUPLING.

Application filed January 20, 1921. Serial No. 438,580.

*To all whom it may concern:*

Be it known that I, THOMAS J. MADIGAN, a citizen of the United States, residing at New York, in the county of New York, State of New York, have invented certain new and useful Improvements in Locked Couplings; and I do hereby declare the following to be a full, clear, and exact description of the invention, such as will enable others skilled in the art to which it appertains to make and use the same.

The present invention relates to means for coupling two tubular members, and is particularly applicable for use in connecting together lengths of hose or other tubing of flexible material. Couplings at present used in fire hose, air lines, and other situations in which an easily attachable, dependable coupling is desired, are open to various objections. The screw threads often become damaged during the coupling operation, especially when one person attempts to effect the coupling unaided. These difficulties are due largely to the fact that no means of common control is provided whereby the parts being coupled may be retained in fixed relative position until after the coupling is effected.

It is accordingly an object of the present invention to provide a combined coupling and nipple of such nature that the parts being coupled may be properly aligned and restrained from relative turning movement independently of the screwing up of the coupling, and in which the tightening process may be subsequently performed by one person in an easy and convenient manner.

It is a further object of the present invention to provide a coupling of this type which compares favorably in cost with the ordinary coupling, the manufacturing operations being simple and the use of material economical.

It is also an object to provide an easily and quickly attachable coupling of this type which may be safely used in high pressure lines and in lines conveying inflammable fluid or other material whose escape would be disastrous.

I have illustrated a preferred embodiment of my invention in the accompanying drawings, in which Fig. 1 is a longitudinal sectional view of my improved coupling showing the interrelation of the parts in connecting together two lengths of tubing; Fig. 2 is a perspective view showing one of the cooperating members of my improved coupling; Fig. 3 is a perspective view of the other member with collar 3 removed; Fig. 4 is a longitudinal sectional view showing a modified form of coupling embodying my invention; and Fig. 5 is a sectional view taken on the line 5—5 of Fig. 4.

Referring to the drawings, particularly to Figs. 1 to 3, 1 and 2 indicate the main coupling members comprising the two cooperating parts of the coupling, and 3 indicates a sliding collar adapted to hold the members 1 and 2 together and form the connection between the adjacent ends of tubes 4 and 5. The member 1 has a cylindrical socket portion 6 whose inner diameter is substantially equal to the outside diameter of the tube 4, and which carries two or more wrench studs 7 formed integrally with the body of the member. This member also carries a slightly raised peripheral flange $1^a$ which is screw-threaded at its outer surface. On the front face of the member 1 and spaced somewhat from its outer periphery is an annular tongue 8 which projects forwardly for inter-engagement with a cooperating portion of the opposing member 2. There is further provided in the inner face of member 1 a polygonal guide opening, here shown of hexagonal shape and of area such that it lies substantially within the inner circumference of the tongue 8.

The tube 4 is held in place within the member 1 by means of metallic ring 9 inserted within the tubing and positioned in such manner that its outer end is substantially flush with the outer end of the socket 6, its inner end lacking a short distance of being flush with the end of the tube 4. This ring is expanded outwardly by means of an arbor inserted within it or by any suitable means, thus pressing the material of the tubing firmly between the ring 9 and the inner wall of the socket 6 and forming a secure fastening. The small annular ridge of the tube material which is forced up at 10 due to the pressure on the ring engages with the inner end of the ring and aids in holding the tube 4 securely within the coupling member.

The opposing coupling member 2 has a socket portion 11 of inner diameter substantially equal to the outside diameter of the tube 5. A raised portion or annular ridge 12 is provided at the outer edge of the socket member 11 for limiting the rearward movement of the collar 3 by engaging with flange 13 carried by the collar. This ridge is preferably formed by inserting an arbor within the socket 11 and expanding the metal a desired amount after collar 3 has been put in place. In advance of the socket portion 7, the member 2 carries a flange 12ª forming an annular shoulder to engage the inwardly projecting annular flange 13 of the threaded collar 3.

The front face of the member 2 has an annular recess provided with a gasket 14, which may be of lead or any suitable material. This annular recess has perpendicular side walls and is spaced a substantial distance from the periphery of the flange to form a lip 15 which acts as a guide to bring the tongue 8 into its final position seated on the gasket 14. There is also provided a nipple 16 integral with the member 2, which is adapted to project an appreciable distance into the hexagonal opening provided in the front face of the member 1. This nipple is of hexagonal cross-section and of the same dimensions as the hole in the face of the member 1. The nipple 16 and its cooperating socket in the opposing member serve to prevent relative rotation of one coupling member with respect to the other. It also serves as a guide when the coupling members are being pushed together, making possible the alignment of the parts being coupled independently of the screwing up of the collar 3 and assisting in bringing the tongue 8 to a true seat upon the gasket 14, even before collar 3 has been screwed up. The tube 5 is secured in the member 2 by means of the expansible ring 9 as has been described.

The collar 3 is substantially cylindrical in shape and is slidable upon the outer surface of the socket portion 11. Screw threads are provided on the interior surface of the collar and are adapted to engage the threads provided upon the flange 1ª of the member 1. Collar 3 is provided at the rearward end with an integral annular flange 13 adapted to engage the flange or raised portion 12ª and thus limit the forward movement of the collar, and to engage the annular flange 12, thus limiting the rearward movement of the collar and preventing its slipping off the coupling member 2 and sliding down the tube 5 out of reach of the worker. Collar 3 is also provided with two or more wrench studs formed integrally with the body of the collar.

To make a coupling, the lengths to be joined are brought together and the nipple 16 inserted into the hexagonal opening in the face of the member 1. The coupling members are then forced together, each telescoping into the other until tongue 8 comes to its final position on the gasket 14. Collar 3 is then slipped forward until its threads engage with those upon the flange 1ª of member 1 and is then tightened up until its flange 13 bears firmly against the off-set portion 12ª provided on the member 2.

I have found that in using the hexagonal nipple 16 as a guide and as means for holding the parts to be coupled in alignment and preventing relative rotation between the coupling members, a coupling is provided which may be easily and conveniently set up by a single person in a fraction of the time required by the ordinary coupling and with no danger of damage to the threads or delay consequent upon such accident.

In Figs. 4 and 5 there is illustrated a modified form of combined coupling and nipple embodying my invention. The structure consists essentially of two cooperating coupling members 1 and 2 and a threaded collar 3 for holding the two cooperating members in engagement. A hexagonal nipple 16, with a corresponding hexagonal recess in the face of the member 1, and also a tongue 8 cooperating with a gasket 14 are provided. These parts of the structure are similar to those shown in Figs. 1 and 3.

The method of attachment of the tubes 4 and 5, however, is different, the member 1 being provided with an integral tubular extension 17 having a succession of concentric ribs 18 over which the tube 4 may be easily slipped, but which offer a relatively great resistance to withdrawal of the tube. Clamping rings 18ª can also be used to hold the tubes in place. An annular flange 19 is provided at the inner end of the tubular extension 17 against which the end of tube 4 abuts. Member 2 is also provided with a similar ribbed tubular extension. The ridge 12 of Fig. 1 may be omitted from member 2, in this embodiment, since the inwardly projecting flange 13 of the collar will abut against the inner end of tube 5 and be prevented from slipping down over the tube and falling out of reach of the worker. The slidable collar 3 may be provided with wrench studs or may be formed as a nut, as shown in Fig. 5.

While I have illustrated preferred embodiments of my invention, it is to be understood that the details of construction may be varied within the full scope of the appended claims.

In both constructions mechanism is provided for permitting compression of the gasket without binding of the nipple with the other member. In the Figure 1 construction, the member 1 has its bore reduced to provide a polygonal opening for engagement by the nipple, and this portion is of such length that the nipple extends through and beyond the same. In the Figure 4 construction, the bore of the member 1 is annularly enlarged at the inner end of the polygonal portion, as clearly shown, to provide a space into which the free end of the nipple may extend. When coupling the parts, the nipple slides freely into the other member guiding and centering the same, and there is no interference with the telescoping of the members, free compression of the gasket being permitted.

I claim:—

1. In a coupling, an externally threaded socket member having a polygonal opening through its center with a tongue projecting from the front face of said member and encircling said opening, an opposing socket member having a polygonal nipple projecting from its front face and having an annular recess encircling said nipple, said recess being provided with a gasket, said coupling members being adapted to telescope one into the other until said tongue seats on said gasket, a threaded collar movable forward over one of said socket members after the tongue is seated on said gasket to engage the threads on the opposing socket member and hold said members tightly in their telescoped relation, said collar-carrying socket member being provided with front and rear flanges for limiting the longitudinal movement of said collar.

2. In a hose coupling, an externally threaded coupling member having a socket portion for receiving the hose and having on its face a forwardly projecting tongue, a polygonal opening encircled by said tongue, an opposing coupling member having a socket portion for receiving the hose and having at its front face a polygonal nipple of appreciable length adapted to telescope into the opening provided in the face of the opposing member, an annular recess encircling said nipple with a gasket therein to which the tongue of the opposing member is guided by the interaction of said polygonal nipple and its opening, a collar carried by one of said coupling members and movable forward after said coupling members have been telescoped into substantially their final relation, said collar engaging with the opposite coupling member to hold said members in coupled relation and front and rear flanges on said collar-carrying socket member for limiting the longitudinal movement of said collar, and an expansible ring within each of said sockets for securing the hose to the coupling member.

In testimony whereof I affix my signature.

THOMAS J. MADIGAN.